March 28, 1939.  L. P. CURTIN  2,152,242
RECOVERY OF LEAD VALUES
Filed Aug. 10, 1935
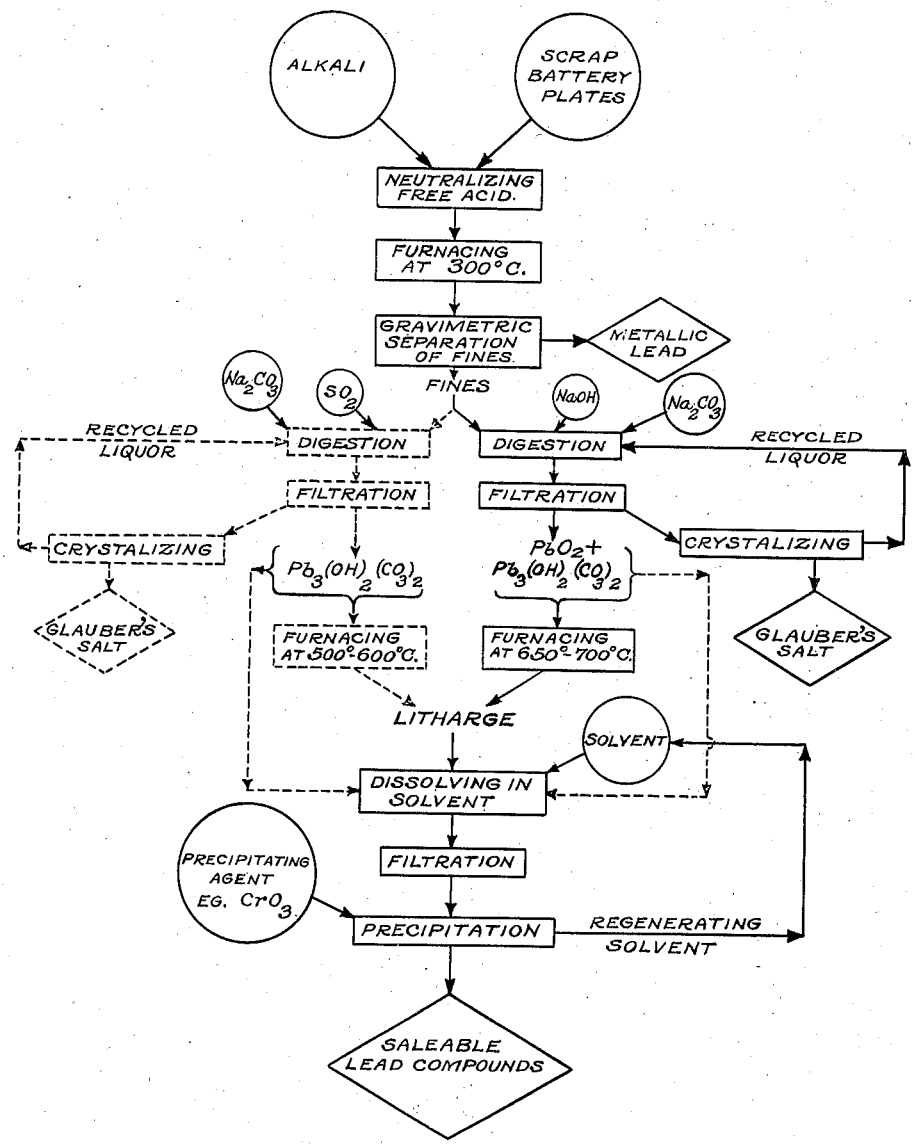
Inventor
Leo P. Curtin,
By Henry C. Parker
Attorney Patented Mar. 28, 1939

2,152,242

UNITED STATES PATENT OFFICE 2,152,242

RECOVERY OF LEAD VALUES

Leo P. Curtin, Cranbury, N. J.

Application August 10, 1935, Serial No. 35,681

16 Claims. (Cl. 23—71)

This invention relates to recovery of lead values and it comprises a process of treating lead sulfate-containing materials, such as the electrically active materials or fines recovered from scrap storage battery plates, wherein such a lead sulfate-containing material is directly converted into lead basic carbonate, usually by treatment with a solution of an alkali carbonate containing sufficient caustic alkali to ensure the formation of the basic carbonate but insufficient to produce appreciable solution of lead, the resulting lead basic carbonate is converted to litharge by a furnacing operation, the litharge is dissolved in a solvent, such as lead acetate or ammonium acetate, the impurities being filtered off, and the dissolved lead is then converted into the desired lead compound, usually by a simple precipitation reaction. When scrap battery plates are employed as a source of lead sulfate, the invention also includes a method of separating the fines from said battery plates, wherein said plates are heated to a temperature just sufficient to melt the grids, and the fines are separated from the heavier melt by a method depending upon differences in gravity; as more fully hereinafter set forth and as claimed.

The problems involved in recovering saleable lead compounds from crude lead sulfate-containing materials have been before the art for a century or longer. The principal source of lead is galena ore and, when this is smelted with admission of air by well-known methods, a by-product containing substantial proportions of lead sulfate is recovered. In this process, as commonly conducted, part of the lead values are volatilized and are collected in the so-called baghouses as lead dust or lead fume, these products containing a substantial lead content, 80 per cent of which may be in the form of lead sulfate. In more recent times the storage battery industry has provided an enormous source of scrap lead, amounting to from two to three hundred million pounds per year, a substantial proportion of which occurs in the form of the so-called fines, the bulk of which is lead sulfate. With this tremendous source of crude lead sulfate-containing material available, an important demand has long existed for inexpensive methods of converting this material to saleable lead compounds.

One of the first methods suggested in the art for recovering values from crude lead sulfate included a digestion treatment with a soda ash solution for conversion of the lead sulfate to lead normal carbonate. Another early method included treatment of the lead sulfate with caustic soda in order to convert it into lead hydroxide. But apparently none of the prior art investigators have suggested treatment of the crude lead sulfate material with mixtures of alkali carbonate and caustic alkali, the proportions of these reagents being controlled in order to produce lead basic carbonate.

Treatment of crude lead sulfate-containing materials with soda ash to produce the normal carbonate of lead is inefficient and undesirable for several reasons. The normal carbonate is no more than four or five times as soluble as the lead sulfate which it is desired to decompose. This advantage obviously becomes reduced as the sulfate ion accumulates in the system towards the end of the digestion. The reaction is therefore quite incomplete and time consuming. Moreover the resulting lead normal carbonate is recovered in the form of a slimy precipitate very difficult to filter even after several days digestion. The caustic alkali method suggested in the prior art is disadvantageous since lead hydroxide is appreciably soluble in such a liquor and a direct loss results. Moreover, the caustic alkali method is more expensive. These disadvantages undoubtedly account for the fact that these proposed methods have not been employed industrially to any extent.

I have found that certain important advantages are gained in the recovery of lead values from lead sulfate-containing materials provided one step of the process comprises the treatment of these materials with a causticized solution of an alkali metal carbonate with the alkalinity of the solution so controlled that lead basic carbonate having a maximum insolubility is produced. The important advantages gained by this method are readily apparent when it is stated that the basic carbonate of lead has only a small fraction of the solubility of the lead normal carbonate. In fact the solubility of the lead basic carbonate is but slightly greater than that of the highly insoluble lead sulfide, PbS. It has even been stated that, if lead basic carbonate is carefully freed from lead normal carbonate and other relatively soluble lead salts, it is not blackened by hydrogen sulfide. This indicates the substantial insolubility of the lead basic carbonate.

When the alkalinity of the digesting liquor is so controlled that lead basic carbonate is produced, a readily filtrable precipitate is obtained within a fraction of the time usually consumed in a digestion resulting in the formation of lead normal carbonate. Recovery of lead values is almost 100 per cent. And the reaction can be conducted either cold or hot, the latter method having the advantages of requiring less time in the digestion step. For these reasons the step of digesting the crude lead sulfate-containing material with the controlled production of lead basic carbonate forms an important step in my present invention. I usually consider it best to conduct this digestion step with a counter-current flow of solids and digesting liquor, for example in a classifier with solids flowing in one direction and the liquor in an opposite direction. Or the digesting liquor may flow through a series of digesting chambers containing the lead sulfate materials.

My invention is illustrated and can be more readily described by reference to the accompanying drawing in which the figure represents, in the form of a flow sheet, an advantageous embodiment of my process as applied to the recovery of lead values from scrap storage battery plates. The raw material is treated by a series of successive operations, which are illustrated on the flow sheet by appropriate legends, with the ultimate production of saleable lead compounds. This flow sheet is believed to be self explanatory.

When scrap battery plates form the starting material of my process, I usually employ a novel method of separating the fines from the grids. As is well-known, storage battery plates consist essentially of (a) a metallic frame or grid of antimonial lead for holding the electrically active materials of the battery and (b) the electrically active materials, pressed, in paste form into the interstices of the grids. These materials, henceforth referred to as "fines", in old batteries consist principally of lead sulfate with lesser amounts of lead dioxide and metallic lead. In separating the fines by my method the free sulfuric acid which is usually present may be first neutralized by alkali, as shown in the flow sheet.

After neutralization of the free sulfuric acid, the scrap plates are furnaced at a temperature just sufficient to melt the antimonial lead of the grids, this temperature ranging from about 275° to 330° C. The fines do not melt at these temperatures but collect on top of the heavier molten lead. They can be separated gravimetrically, that is by methods depending upon differences in gravity. Thus the melted lead can be drawn off or decanted, or it may be passed through a fine mesh screen, which may be rotated. Another method which is highly effective is to pass the lead through a centrifugal separator which readily separates the fines from the melt.

The furnacing method of recovering the fines from scrap battery plates eliminates a considerable portion of the lead from the fines and hence is more advantageous than the tumbling methods which have been proposed in the art for this purpose. The fines which have been separated by these tumbling methods, however, may be treated advantageously by my process. The antimonial lead recovered in the furnacing step may be used as such or it may be "softened" into ordinary pig lead.

The digestion step of my invention, as well as the following steps, can be applied to any of the numerous industrial sources of lead sulfate, such as roasted galena ore, bag-house dust or fume, as well as to the fines recovered from scrap battery plates. As previously stated, the leaf-sulfate-containing material is advantageously digested with a causticized alkali metal carbonate solution with control of the alkalinity to produce lead basic carbonate of maximum insolubility. This step is illustrated on the flow sheet in full lines. The equation of the chemical reaction involved is as follows:

I $3PbSO_4 + 2NaOH + 2Na_2CO_3 \rightarrow$
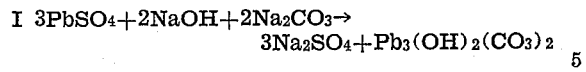
$3Na_2SO_4 + Pb_3(OH)_2(CO_3)_2$ As indicated this equation the soda ash and caustic soda are consumed in the digesting liquor in substantially the proportions above indicated. For the production of maximum insolubility in the resulting lead basic carbonate, however, I have found that, at the completion of the digestion, the leach liquor should have a residual mono-carbonate alkalinity; that is the carbonate is advantageously employed in excess. The desired mono-carbonate alkalinity after digestion need be not substantial. Any appreciable caustic alkalinity is detrimental in that the lead becomes soluble in such a liquor.

In the conduct of my process I usually so control the amount and the concentration of the digesting liquor that, at the conclusion of the digestion step, the liquor will contain practically no caustic soda. A moderate excess of sodium carbonate is desirable but not essential, since any excess can vary within rather wide limits.

The exact concentrations of alkali metal carbonate and caustic alkali required in the original digesting liquor varies to some extent with the starting material. For example storage battery fines obtained by the ordinary tumbling methods contain appreciable amounts of free sulfuric acid, while some of the smelted ores contain a certain amount of alkali. Allowance has to be made for the presence of such impurities.

In an alternative method of treating storage battery fines, shown in dotted lines on the flow sheet the lead dioxide present in the fines may be decomposed by the use of alkali metal sulfites or bisulfites or by the introduction of $SO_2$ into the digesting liquor. The equation of reaction may be written as follows:

II $Na_2SO_3 + 2Na_2CO_3 + PbO_2 + 2PbSO_4 + H_2O \rightarrow$
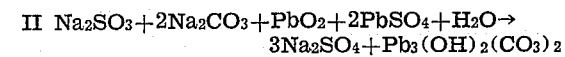
$3Na_2SO_4 + Pb_3(OH)_2(CO_3)_2$ As this equation indicates, the lead sulfate present can be converted into lead basic carbonate simultaneously with the conversion of the lead dioxide into the basic carbonate. The equation also shows that, to the extent that lead dioxide is present, sodium sulfite may be used to replace the sodium hydroxide which is employed in the reaction following Equation I. However, it is usually necessary to add caustic alkali in the digestion step since there is usually less $PbO_2$ present than is indicated in reaction II. In such a case Reactions I and II take place simultaneously. The conversion of the $PbO_2$ into basic carbonate takes place readily by this reaction, especially at slightly elevated temperatures. An excess of sodium sulfite is desirable. Of course there are many other reagents which can be employed for reducing the $PbO_2$, among which can be mentioned carbon monoxide, hydrogen, hydrogen sulfide, etc. I consider the use of a sulfite reducing agent, such as sulfur dioxide, sulfurous acid or sulfites best, however, owing to the fact that these reagents can be used in combination with the reaction for elimination of sulfates, both reactions occurring simultaneously in the same solution and resulting in the same products.

The crude lead basic carbonate precipitate obtained by the latter described reaction is a light grey, easily filtrable powder, the bulk of which is lead basic carbonate, together with various impurities which are insoluble in the digesting liquor. The method wherein caustic soda and soda ash are employed (Equation I) produces a product containing some lead dioxide while that employing $SO_2$ or a sulfite (Equation II) yields a product substantially free from this compound and usually containing over 90 per cent of lead basic carbonate. In both methods the lead basic carbonate produced is substantially free from the normal carbonate. In both of these methods sodium sulfate is a byproduct of the reaction. This can be recovered from the digestion liquor as Glauber's salt, or anhydrous sodium sulfate, by a cooling step, after which the liquor can be reinforced and re-used. In both methods countercurrent digestion can be employed.

The digestion step of my process can be conducted either hot or cold. I usually conduct this step at temperatures ranging from about 80° to 100° C., owing to the fact that the time required for the digestion is less at higher temperatures and a more readily filtered precipitate is obtained. It is also possible to employ temperatures above 100° C. and at corresponding superatmospheric pressures.

If it is desired to prepare lead chromate, lead arsenate or lead acetate, for example, this may be accomplished by treating the impure lead basic carbonate precipitate, obtained as described above, with a slight excess of acetic or nitric acid, this operation giving a solution of lead acetate or nitrate. The impurities are then filtered off and to the filtrate there may be added chromic acid or a soluble chromate, giving an immediate precipitate of substantially pure lead chromate. Lead arsenate may be prepared in a similar manner by the addition of arsenic acid or a soluble arsenate to the filtrate. If chromic or arsenic acid is used, the acetic acid is regenerated and may then be recycled. Precipitation may be accomplished either hot or cold. This optional procedure is indicated on the flow sheet by dotted lines connecting the formulae for the basic carbonate precipitate with the dissolving step.

If lead acetate is desired, the best procedure is to treat the crude lead basic carbonate with a hot solution containing enough acetic acid to make an almost saturated solution of lead acetate. Upon filtering and cooling the resulting solution, the filtrate deposits crystals of lead acetate.

In the manufacture of white lead, red lead and lead monoxide, or litharge, I consider it essential to subject the crude lead basic carbonate, obtained as described above, to a heating or calcining operation in order to convert it into crude lead monoxide, prior to solution and final precipitation. When lead dioxide is present in the basic carbonate the temperature used in the heating step ranges from about 650° to 700° C. But when the lead dioxide is absent, it is possible to employ temperatures considerably lower, ranging from about 450° to 600° C. During this heating step any metallic lead which may be present is largely converted into lead monoxide. The chemical equations involved in the heating step are:

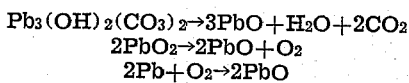

$$Pb_3(OH)_2(CO_3)_2 \rightarrow 3PbO + H_2O + 2CO_2$$
$$2PbO_2 \rightarrow 2PbO + O_2$$
$$2Pb + O_2 \rightarrow 2PbO$$

The heating is best done with exclusion of air although this is not necessary, if the calcining is conducted at temperatures above the range in which red lead forms.

After the crude lead basic carbonate is converted by calcination into crude lead monoxide, the lead is brought into solution by treating it with a suitable solvent. Many solvents are known which are suitable in this step. But many of these solvents are of low efficiency. The solvents which I consider best are lead acetate, ammonium acetate, calcium acetate, acetic acid and nitric acid. It is also possible to employ mixed solvents, such as a mixture of lead and ammonium acetates or of ammonium acetate and calcium acetate, as suggested in my patent No. 1,916,303.

After the basic carbonate is dissolved, the next step is a filtration. Filtration removes various impurities and foreign matter which are derived from the battery plates. This is an important step in my process since prior art methods, in which lead oxide, red lead, white lead and the like are prepared without dissolving the lead and filtering to remove impurities, produce products containing particles of lead, iron, antimony and other metals, undecomposed lead compounds, carbon and miscellaneous dirt, these products being obviously too impure for modern requirements.

The steps involved in my process subsequent to dissolving the lead values and filtering off impurities depend upon the ultimate products which are desired. It is possible at this point to merely add a precipitating agent such as chromic or arsenic acid, producing a metathetic reaction, and to recover the precipitate. For the preparation of white lead, I find it most convenient to dissolve the lead monoxide in lead acetate or ammonium acetate solution and then precipitate the lead basic carbonate with carbon dioxide, avoiding excess of $CO_2$. This procedure gives a white lead of high purity. Highly pure litharge or red lead may be obtained by calcining or roasting this material. If lead chromate or arsenate are to be produced, acetic acid is a satisfactory cyclic solvent since these materials can be precipitated from acid solution by reactions which liberate free acid in the solution.

The procedures which have been described are capable of modification in various ways without departing from the scope of my invention. My process can be modified in order to adapt it particularly to the lead sulfate-containing starting material which is to be employed. In the digesting step of my invention various alkali metal carbonates can be employed while both alkali metal and alkaline earth metal causticizing agents (for example CaO) can be employed. Modifications which fall within the scope of the following claims will be readily apparent to the art.

What I claim is:

1. In the recovery of lead values, the process which comprises neutralizing the free acid in scrap storage battery plates, separating the fines from the grids, converting the fines into lead basic carbonate substantially free from the normal carbonate by a digestion step with an aqueous liquor comprising a caustic alkali and an alkali metal carbonate, in such proportions that the carbonate is in excess while only sufficient caustic alkali is present to insure the production of lead basic carbonate substantially free from the normal carbonate, dissolving said lead basic carbonate in a solvent, filtering off the insoluble impurities, precipitating the lead values in the filtrate by a metathetic reaction and recovering said precipitate.

2. In the recovery of lead values, the process which comprises neutralizing the free acid in scrap storage battery plates, separating the fines from the grids and converting said fines into lead basic carbonates substantially free from the normal carbonate by counter-current treatment with an aqueous solution comprising an alkali metal carbonate having a caustic alkalinity sufficient to produce said lead basic carbonate.

3. The process which comprises digesting a mixture of lead sulfate and lead dioxide with an aqueous solution of an alkali metal carbonate and reducing the tetravalent lead present to divalent lead by the addition of a reducing agent selected from a class consisting of sulfur dioxide, sulfurous acid and alkali metal sulfites and bisulfites.

4. The process of claim 3 wherein a caustic alkali is added to the digesting solution to maintain the same at an alkalinity resulting in the formation of lead basic carbonate substantially free from lead normal carbonate.

5. In the recovery of lead values from the fines of scrap battery plates, the process which comprises digesting said fines with an aqueous solution containing an alkali metal carbonate and an inorganic chemical capable of reducing the tetravalent lead present to the divalent form and sufficient caustic alkali to cause precipitation of lead basic carbonate substantially free from the normal carbonate.

6. In the recovery of lead values from the fines of scrap battery plates, the process which comprises digesting said fines with an aqueous solution containing an alkali metal carbonate and an inorganic reducing reagent capable of reducing the tetravalent lead present to the divalent form and sufficient caustic alkali to cause precipitation of lead basic carbonate substantially free from the normal carbonate, converting said lead basic carbonate into lead monoxide by a heating operation, dissolving said lead monoxide in a solvent, filtering off impurities, precipitating the lead content of the filtrate in the form of a saleable lead compound by a metathetic reaction and recovering said lead compound.

7. In the recovery of lead values from the fines of scrap battery plates, the process which comprises digesting said fines with an aqueous solution containing an alkali metal carbonate and a reducing reagent capable of reducing the tetravalent lead present to the divalent condition and sufficient caustic alkali to cause precipitation of lead basic carbonate substantially free from the normal carbonate, dissolving said basic carbonate in a solvent, filtering off impurities, precipitating the lead values of the filtrate in the form of a saleable lead compound and recovering said lead compound.

8. In the recovery of lead values from the fines of scrap battery plates, the process which comprises digesting said fines with an aqueous solution containing an alkali metal carbonate and an inorganic reducing reagent capable of reducing the tetravalent lead present to the divalent form and sufficient caustic alkali to cause precipitation of lead basic carbonate substantially free from the normal carbonate, filtering off said basic carbonate, cooling the filtrate to recover sodium sulfate, reinforcing the mother liquor and employing it in a second digestion step.

9. In the recovery of lead values, the process which comprises digesting a lead sulfate-containing material with an aqueous solution containing an alkali metal carbonate and sufficient causticizing agent to produce a conversion of said lead sulfate into lead basic carbonate substantially free from the normal carbonate, dissolving said basic carbonate in an acid solvent for lead, precipitating the lead from said solution by adding thereto an acid producing an insoluble lead compound, thereby regenerating said acid solvent in the solution, separating said insoluble lead compound from the mother liquor and recycling said motor liquor in a repetition of the process.

10. The process of claim 1 wherein the lead is recovered as lead basic carbonate by precipitation with carbon dioxide.

11. The process of claim 1 wherein the lead values are recovered as lead chromate by the addition to said filtrate of a compound selected from a class consisting of chromic acid and soluble chromates.

12. The process of claim 1 wherein the lead values are recovered in the form of lead arsenate by addition to said filtrate of a compound selected from a class consisting of arsenic acid and soluble arsenates.

13. The process of claim 6 wherein the lead values are recovered in the form of lead basic carbonate by addition to said filtrate of carbon dioxide, with avoidance of excess carbon dioxide.

14. In the process of recovering lead values from lead sulfate containing materials by the wet method, the step which comprises digesting such a material in an aqueous solution containing an alkali metal carbonate and a caustic alkali in substantially such proportions as to react in accordance with the equation $$3PbSO_4 + 2NaOH + 2Na_2CO_3 \rightarrow 3Na_2SO_4 + Pb_3(OH)_2(CO_3)_2$$

thereby producing lead basic carbonate substantially free from lead normal carbonate.

15. The process of claim 5 wherein the inorganic reducing agent is an alkali metal sulfite.

16. In the process of recovering lead values, the step which comprises digesting a crude lead sulfate-containing material with an aqueous liquor comprising an alkali metal carbonate and a caustic alkali, in such proportions that the carbonate is in excess while sufficient caustic alkali is present to insure the production of lead basic carbonate substantially free from the normal carbonate; the alkalinity of the said liquor being controlled to produce a resulting liquor having a residual mono-carbonate alkalinity but substantially free from caustic alkalinity.

LEO P. CURTIN.